(12) United States Patent
Huang et al.

(10) Patent No.: US 9,547,718 B2
(45) Date of Patent: Jan. 17, 2017

(54) HIGH PRECISION SET EXPANSION FOR LARGE CONCEPTS

(75) Inventors: Jiewen Huang, New Haven, CT (US);
Zhimin Chen, Seattle, WA (US);
Arvind Arasu, Bothell, WA (US);
Vivek Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 13/325,072

(22) Filed: Dec. 14, 2011

(65) Prior Publication Data

US 2013/0159317 A1    Jun. 20, 2013

(51) Int. Cl.
*G06F 17/30* (2006.01)
(52) U.S. Cl.
CPC .............................. *G06F 17/30867* (2013.01)
(58) Field of Classification Search
CPC ................... G06F 17/30861; G06F 17/30867
USPC .................................................. 707/748, 765
See application file for complete search history.

(56) References Cited

U.S. PATENT DOCUMENTS

| 7,194,483 | B1 | 3/2007 | Mohan et al. | |
| 7,496,593 | B2 | 2/2009 | Gardner et al. | |
| 8,250,008 | B1* | 8/2012 | Cao et al. | 706/14 |
| 2004/0254917 | A1* | 12/2004 | Brill et al. | 707/3 |
| 2007/0282826 | A1 | 12/2007 | Hoeber et al. | |
| 2008/0082481 | A1* | 4/2008 | Joshi et al. | 707/2 |
| 2009/0037399 | A1* | 2/2009 | Bartz et al. | 707/5 |
| 2011/0251839 | A1* | 10/2011 | Achtermann et al. | 704/9 |

OTHER PUBLICATIONS

Richard C. Wang and William W. Cohen. Language-Independent Set Expansion of Named Entities using the Web, (2007) [retrieved on Dec. 27, 2012], pp. 342-350. Retrieved from the Internet: http://dl.acm.org/citation.cfm?id=1442086.*
Andrew Carlson, Justin Betteridge, Richard C. Wang, Estevam R. Hruschka Jr., and Tom M. Mitchell. Coupled Semi-Supervised Learning for Information Extraction, (2010) [retrieved on Dec. 27, 2012], pp. 101-110. Retrieved from the Internet: http://dl.acm.org/citation.cfm?id=1718501.*

(Continued)

*Primary Examiner* — Kris Andersen
(74) *Attorney, Agent, or Firm* — Nicholas Chen; Kate Drakos; Micky Minhas

(57) ABSTRACT

A set expansion system is described herein that improves precision, recall, and performance of prior set expansion methods for large sets of data. The system maintains high precision and recall by 1) identifying the qualify of particular lists and applying that quality through a weight, 2) allowing for the specification or negative examples in a set of seeds to reduce the introduction of bad entities into the set, and 3) applying a cutoff to eliminate lists that include a low number of positive matches. The system may perform multiple passes to first generate a good candidate result set and then refine the set to find a set with highest quality. The system may also apply Map Reduce or other distributed processing techniques to allow calculation in parallel. Thus, the system efficiently expands large concept sets from a potentially small set of initial seeds from readily available web data.

15 Claims, 3 Drawing Sheets

(56) References Cited

OTHER PUBLICATIONS

He, et al., "SEISA: Set Expansion by Iterative Similarity Aggregation", Retrieved at <<http://www.www2011india.com/proceeding/proceedings/p427.pdf>>, Proceedings of the 20th international conference on World wide web (WWW), Mar. 28-Apr. 1, 2011, pp. 427-436.

Kim, et al., "Improving Web Page Classification by Label-propagation over Click Graphs", Retrieved at <<http://www.patrickpantel.com/download/papers/2009/cikm09c.pdf>>, Proceeding of the 18th ACM conference on Information and knowledge management, Nov. 2-6, 2009, pp. 10.

Vyas, et al., "Helping Editors Choose Better Seed Sets for Entity Set Expansion", Retrieved at <<http://www.google.co.in/url?sa=t&source=web&cd=6&sqi=2&ved=0CDoQFjAF&url=http%3A%2F%2Flabs.yahoo.com%2Ffiles%2FCIKM2009_p225-1.pdf&ei=48CbToqvKNDRrQf52-GIBA&usg=AFQjCNFW89unTftYZLK8lZhFKEsPEB-prQ>>, Proceeding of the 18th ACM conference on Information and knowledge management, Nov. 2-6, 2009, pp. 225-234.

"Set Logic and Intersections Defined", Retrieved at <<http://www.thunderstone.com/site/texisman/set_logic_and_intersections.html>>, Retrieved Date: Oct. 17, 2011, pp. 2.

Kozareva, et al., "Learning and Evaluating the Content and Structure of a Term Taxonomy", Retrieved at <<http://www.cs.utah.edu/~riloff/pdfs/aaai09-LbRsymp.pdf>>, Spring Symposium on Learning by Reading and Learning to Read (AAAI), 2009, pp. 8.

"Iterative Set Expansion Using Samples", U.S. Appl. No. 13/163,736, filed Jun. 20, 2011, pp. 35.

\* cited by examiner

HIGH PRECISION SET EXPANSION FOR LARGE CONCEPTS

BACKGROUND

Set expansion refers to the practical problem of expanding a small set of "seed" entities, into a more complete set by discovering other entities that also belong to the same "concept set". Here a "concept set" can be any collection of entities that conceptually form a set that people have in mind, and "seeds" are the instances of entities in the set. As an example, a person wanting to discover all camera brand names may give a small number of well-known brand names like "Canon" and "Nikon" as seeds; the set expansion techniques would leverage the given data sources to discover other camera brands, such as "Leica", "Pentax" and "Olympus" that are also camera brands.

Set expansion systems are of practical importance and can be used in various applications. For instance, web search engines may use the set expansion tools to create a comprehensive entity repository (for, say, brand names of each product category), in order to deliver better results to entity-oriented queries. As another example, the task of named entity recognition can also leverage the results generated by set expansion tools.

There is a substantial amount of data on the web, but present set expansion techniques work poorly with noisy web data. Two readily available forms of general web data sources are Hypertext Markup Language (HTML) lists extracted from web pages by web crawls (henceforth referred to as web lists) and web search query logs (query logs). Such general-purpose web data can be highly useful for set expansion tasks: they are very diverse in nature, with rich information that covers most domains of interest. In addition, since these general data are not domain/seed specific, they can be pre-processed and optimized for efficiency purposes. However, these general web data can be inherently noisy. Random walk or other similarity measures alone may not be sufficient to distinguish true results from the noises, especially when the number of seeds is limited. Random walk based ranking techniques used in previous work perform poorly on general-purpose web lists and query logs and produce results with low precision/recall. Partly because of that, previous approaches use seed-specific and page-specific wrappers to reduce the candidate set to a smaller and much cleaner subset over which the random walk based ranking techniques work reasonably well. However, this additional data extraction process is at the cost of overall architectural complexity and system responsiveness.

One set expansion system for using web data to expand a set of seed entities is presented in U.S. patent application Ser. No. 13/163,736 entitled "ITERATIVE SET EXPANSION USING SAMPLES," and filed on Jun. 20, 2011, which is hereby incorporated by reference and referred to herein as SEISA. SEISA solves several of the above problems. SEISA uses web-lists as one data source. A web-list is the hypertext markup language (HTML) fragments between <ul> or <ol> and its corresponding closing </ul> or </ol> tag. The text between each <li> and its closing </li> tag is considered as a named entity. All named entities that belong to the same web-list are considered to be from the same concept set. The similarity between any two named entities are measured by how many web-lists they share versus how many web-lists they belong to using popular scoring functions such as Jaccard or Cosine. For example, if Boston belongs to List_1 and List_2 and Chicago belongs to List_1 and List_3, and using Jaccard as the similarity function, then Similarity (Boston, Chicago)=1/(2+2−1)=0.33.

Experiments show SEISA works well for concepts of relatively small cardinality such as countries and colors. However, in practice there are also uses for expanding a large concept that includes many entities such as all the cities in the United States. Such expanded sets can be used for data cleaning or as features for name entity recognition in document understanding. One typical behavior of set expansion algorithms is as the expanded set becomes larger, the expansion precision (that is, fraction of the expanded set that belongs to the concept set) drops. So one particularly interesting application setting is to find as many entities as possible in a large concept while keeping the precision of the expanded set above a relatively high threshold such as 0.9. There are a few drawbacks when applying SEISA in the above setting. First, SEISA treats each web-list as equal so that introducing less popular entities in a large concept is likely to reduce the quality score. Second, SEISA does not use negative seeds so that giving feedback that New Jersey is not a city is not possible.

SUMMARY

A set expansion system is described herein that improves precision, recall, and performance of prior set expansion methods for large sets of data. The system maintains high precision and recall by 1) identifying the qualify of particular lists and applying that quality through a weight, 2) allowing for the specification or negative examples in a set of seeds to reduce the introduction of bad entities into the set, and 3) applying a cutoff to eliminate lists that include a low number of positive matches. The system may perform multiple passes to first generate a good candidate result set and then refine the set to find a set with highest quality. The system may also apply Map Reduce or other distributed processing techniques to allow calculation in parallel and improve performance over prior methods. Thus, the set expansion system efficiently expands large concept sets from a potentially small set of initial seeds from readily available web data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
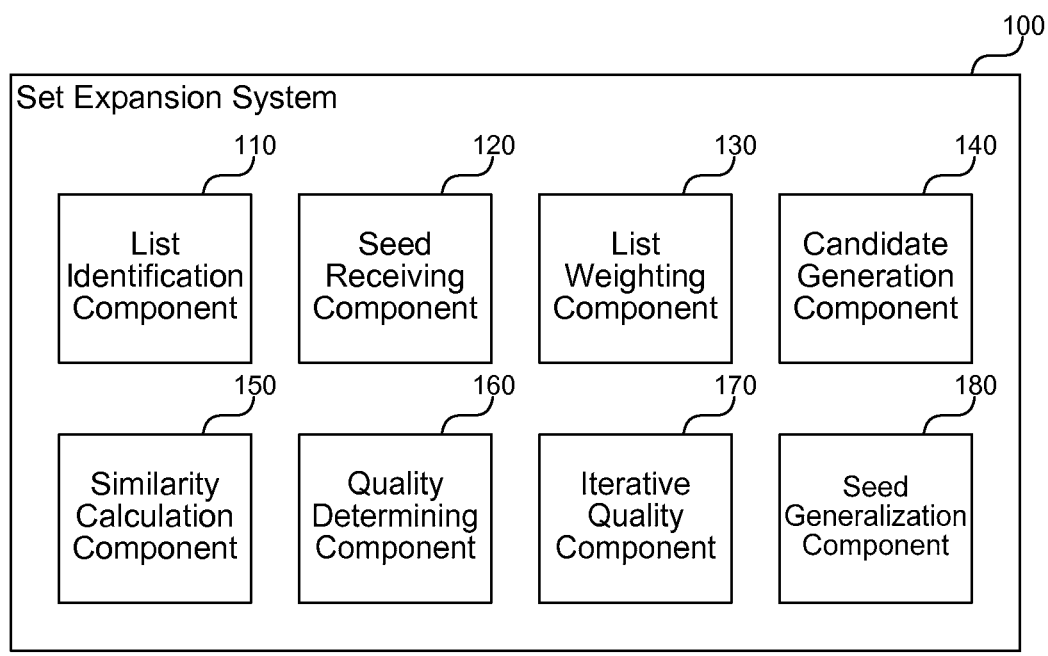
FIG. 1 is a block diagram that illustrates components of the set expansion system, in one embodiment.

A set expansion system is described herein that improves precision, recall, and performance of prior set expansion methods for large sets of data. The system maintains high precision and recall by 1) identifying the quality of particular lists and applying that quality through a weight, 2)

allowing for the specification or negative examples in a set of seeds to reduce the introduction of bad entities into the set, and 3) applying a cutoff to eliminate lists that include a low number of positive matches. Recall refers to how many entities are identified in the concept set, and measures how well the method performs at adding entities to the set that belong in the set. Precision refers to the overall quality of the set, and a high precision indicates that the set is likely very good (i.e., relevant and coherent). The system may perform multiple passes to first generate a good candidate result set and then refine the set to find a set with highest quality. The system may also apply Map Reduce or other distributed processing techniques to allow calculation in parallel and improve performance over prior methods. Thus, the set expansion system efficiently expands large concept sets from a potentially small set of initial seeds from readily available web data.

In one example, the city Boston belongs to List_1 and List_2 while the city Chicago belongs to List_3. As noted above, using Jaccard as the similarity function, Similarity (Boston, Chicago)=1/3=0.33. Based on this pairwise similarity measure, SEISA quantifies the quality of a set of expanded entities R as the following, where R is the expanded set, S is the seed set, $\alpha$ is between 0 and 1 to trade off the importance of how similar R is to S (i.e., relevance) and how similar R is to itself (i.e., coherence).

$$\alpha \frac{1}{|R| \times |S|} \sum_{r \in R} \sum_{s \in S} Sim(r, s) + (1-\alpha) \frac{1}{|R| \times |R|} \sum_{r \in R} \sum_{r \in R} Sim(r, r) \quad (1)$$

In some embodiments, the set expansion system applies SEISA's framework and the above formula to quantify the quality of expansion. However, the system changes the core part of SEISA or similar methods, the pairwise similarity measure. The first observation is that given a set of seeds and negative seeds, not all web lists are equal. Some lists contain many seeds, while some contain none. Some lists contain negative seeds, while others contain none. The set expansion system introduces a weight to each web list to reflect the list's likely contribution to the concept set. The intuition is that a list that contains more seeds that are positive (and fewer negative seeds) is more likely to have entities in the concept set. The weight for any given list is defined as:

$$w(l) = \frac{|Pin| + |Nout|}{|P| + |N|} \quad (2)$$

Where Pin: Positive seeds in web-list ι, Nout: Negative seeds not in ι, P: All positive seeds, N: AH negative seeds. The pairwise similarity is defined as Weighted Jaccard or Weighted Cosine. Thus, the similarity of any particular entity r with a given seed s is determined by dividing the sum of the weights of all of the lists that contain both r and s by the sum of the weights of all of the lists that contain either r or s. In terms of SEISA, the result in SEISA assumes all lists are equally weighted.

For example, if the positive seeds are {New York, Los Angeles, Boston}, negative seeds are an empty set { }, list_1 is {Boston, New York, Chicago}, list_2 is {Boston}, and list_3 is {Chicago, Dream Girls}, then $w(list\_1)=(2+0)/(3+0)=0.67$ $w(list\_2)=(1+0)/(3+0)=0.33$ $w(list\_3)=(0+0)/(3+0)=0$ Since {Lists that contain Boston and Chicago}={list_1}

{Lists that contain Boston or Chicago}={list_1, list_2, list_3}, so

Similarity (Boston, Chicago)=w(list_1)/[w(list_1)+w(list_2)+w(list_3)]=0.67/(0.67+0.33+0)=0.67

Comparing this to SEISA, which scores Similarity (Boston, Chicago)=0.33, the system herein gives a more appropriate score.

As another example, if the positive seeds are still {New York, Los Angeles, Boston}, negative seeds are {New Jersey}, list_1, list_2, and list_3 are unchanged from the previous example, then:

$w(list\_1)=(2+1)/(3+1)=0.75$ $w(list\_2)=(1+1)/(3+1)=0.5$ $w(list\_3)=(0+1)/(3+1)=0.25$ Similarity (Boston, Chicago)=w(list_1)/[w(list_1)+w(list_2)+w(list_3)]=0.75/(0.75+0.5+0.25)=0.5.

The second observation is that if a web-list only contains a relatively small number of positive seeds then it is not trustworthy. Thus, in some embodiments, the set expansion system modifies formula (2) by imposing a cutoff t. If a web-list does not contain more than t positive seeds, its weight is set to zero. This also overcomes a potentially undesirable effect in weighting scheme (2) such that a list can accumulate a non-negligible weight simply by not containing negative seeds.

For example, set cutoff=2, and everything else the same as the prior example, then:

$w(list\_1)=(2+1)/(3+1)=0.75$ $w(list\_2)=0$ (not satisfying cutoff)

$w(list\_3)=0$ (not satisfying cutoff)

Similarity (Boston, Chicago)=w(list_1)/[w(list_1)+w(list_2)+w(list_3)]=0.75/(0.75+0+0)=1

Set expansion often begins with a small number of seeds (e.g., three to six), so a high cutoff may not be possible. Thus, in some embodiments, the set expansion system applies a two or more pass approach. The first pass uses SEISA or the method herein with no cutoff to get more seeds. Usually the top 100 expanded entities from SEISA are quite good. The system can then use these seeds for a subsequent pass that applies a cutoff to achieve very accurate results.

The third observation is that it is useful to generalize from negative seeds to remove any negative terms from a candidate result set. One might be tempted to run SEISA on the negative seeds and just subtract the expanded entities from the positive expansion. This may not produce good results in practice because negative seeds often come from evaluation of the expansion output. This means that negative seeds may not form a coherent concept. Thus, in some embodiments, the set expansion system uses nearest neighbor to generalize from negative seeds. For each entity e in the expansion set, the system computes Similarity (e, P)=max {Similarity (e, p) where P is positive seeds and p in P}, and Similarity (e, N)=max {Similarity (e, n) where N is negative seeds and n in N}. If Similarity (e, P)<Similarity (e, N), the system removes e from expanded set. In other words, it is desirable that any term in the result set that is more coherent with the negative seeds than the positive seeds be removed from the result set.

FIG. 1 is a block diagram that illustrates components of the set expansion system, in one embodiment. The system 100 includes a list identification component 110, a seed receiving component 120, a list weighting component 130, a candidate generation component 140, a similarity calculation component 150, a quality determining component 160, an iterative quality component 170, and a seed generalization component 180. Each of these components is described in further detail herein.

The list identification component 110 identifies one or more sources of potential entities that belong to a concept set of entities for expanding a known set of seed entities to include a larger portion of the concept set. The component 110 may identify web lists, web query logs, or other sources of potential entities for expanding a set. The component 110 may crawl the web or utilize an existing set of output from a crawl of the web. In some embodiments, the system 100 operates in conjunction with a search engine and has access to data identified by the search engine.

The seed receiving component 120 receives a set of positive seed items and a set of negative seed items, wherein the positive seed items represent items to expand and find similar items and the negative seed items represent items that are not indicative of similar items. The seed items may be provided manually by a user or through another automated process that identifies seeds. For example, an e-commerce retailer with a website listing one type of product may provide the product brand names as one type of seed to find other brands of the same product type. The system 100 may provide an application-programming interface (API) through which other software components can programmatically access the system 400 to perform set expansion. The system 400 can be incorporated into a number of other processes useful to users for a variety of tasks. In some embodiments, the system 100 models the identified sources and received seed items as a bipartite graph with candidate terms being nodes on one side and identified context nodes on the other side.

The list weighting component 130 determines a weight for each list based on a number of positive seed items contained in the list and a number of negative seed items contained in the list. For example, the component 130 may calculate the weight by adding how many positive seed items are in the list to how many negative seed items are not in the list, and then dividing this number by a total number of positive and negative seed items. This provides an indication of how similar the list is to the received seed items. The component 130 may also apply a cutoff whereby the weight of a list that does not contain a threshold number of positive seed items is reduced or set to zero. The component 130 may also apply cutoff based on negative seed items whereby a list with too many negative seed items is assigned a reduced or zero weight. The list weighting component 130 can calculate weights according to a number of formulas known to those of ordinary skill in the art and the system 100 is extensible to allow new formulas based on particular problem domains or tasks.

The candidate generation component 140 generates one or more candidate result sets that contain an expansion of items in addition to the received positive seed items, wherein the expansion includes one or more items discovered in the identified sources. The candidate generation component 140 may use a variety of methods to generate candidate result sets, such as the static and dynamic thresholding methods described by SEISA. In some embodiments, the component 140 may apply a brute force approach and initially include all list items found in the identified sources, then reduce the candidate result set down to a determined good set based on iterative removal of items and optimization of the qualify measurement described herein. The techniques herein provide a good measurement of quality for any given candidate result set, and the system 100 can help find a good result set given a particular starting candidate result set.

The similarity calculation component 150 determines a similarity metric between each entity in a generated candidate result set and one or more of the received seed items. The component 150 may determine a Jaccard Similarity that compares the intersection and union of the sources in which each entity is found to determine the similarity metric. Alternatively or additionally, the system may determine a Cosine Similarity based on weight vectors that indicate the weights of the edges that connect the context nodes to the two candidate nodes. Other similarity metrics can also be provided by the component 150. In determining similarity, the component 150 applies the weighs determined by the list weighting component 130 for each list in which the entity is found.

The quality determining component 160 combines a determined relevance metric and a coherence metric to determine a quality metric that indicates relevance and coherence among a set of entities in the generated candidate result set. The quality metric may apply a weighting factor to the relevance and coherence so that each metric does not contribute equally to the resulting quality metric. Any particular implementation can set the weighting as desired and in some cases, an implementation may allow the weighting to be configured or provided as input to an API that invokes the system 100.

The quality determining component 160 determines the relevance metric based on how similar an entity in the candidate result set is to the received seed items. The component 160 invokes the similarity calculation component 150 to determine similarity between any identified entity and the seed terms. The relevance metric indicates nearness of two concepts together, and how frequently they occur together in observable data, such as web lists or web query logs.

The quality determining component 160 determines the coherence metric based on how consistent an entity in the candidate result set is with the rest of the candidate result set. Whereas relevance considers similarity between a node to the seeds, coherence considers similarity of nodes to other candidate nodes (and potentially the seeds also). Thus, the coherence measurement helps to identify nodes that are relevant but nonetheless likely do not belong in the same expanded set because they are incoherent compared to other candidate nodes. The component 160 invokes the similarity calculation component 150 to determine similarity between any identified node and a set of nodes. Determining coherence in addition to relevance helps to reduce noise and allows the system 100 to operate with potentially noisier datasets like web data.

The iterative quality component 170 finds an acceptable result set by generating an initial candidate result set with a base quality metric and iteratively generating new candidate result sets with improved quality metrics. The component 170 may apply a variety of techniques to select an initial result set, such as those described by SEISA. The iterative quality component 170 may receive an initial result set as input and perform an iterative process to get a better and better result set until either a threshold number of iterations or until the quality of the expanded set has been maximized or achieves some threshold precision. The component 170 may also apply a thresholding function to determine a size of the candidate result set that has a sufficiently high relevance metric and coherence metric. The threshold may be set statically based on an initial set of candidate nodes or may be determined dynamically and updated with each iteration. The component 170 may accept input that identifies a target value for precision or recall of an output result set.

Upon completion, the iterative quality component 170 reports the identified expanded seed set as output. The output of the system 100 may provide the input to a complementary process that performs other work, such as using the expanded seed set to recommend products to users, to suggest friends in a social network, to verify item categorization, and so forth. The reporting may occur programmatically, to a user interface, to a file, or in any other form chosen for a particular implementation of the system 100. In some cases, the system 100 may run periodically to update set results and report any change in the expanded seed set. For example, over time, new products may be released or other items related to the purpose of the set, for which the set is updated.

The seed generalization component 180 is optionally invoked by the system to generalize received negative seed items. Generalization identifies other candidate items that are more like the negative seed items than the positive seed items. In some embodiments, the component 180 determines a similarity of each entity in the candidate result set with the received positive seed items and the received negative seed items. For any entity that is more similar to the negative seed items, the component 180 may remove the item from the candidate result set. In this way, the system refines the candidate result set to ensure that no negative seed items or items like negative seed items are in the output results.

The computing device on which the set expansion system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
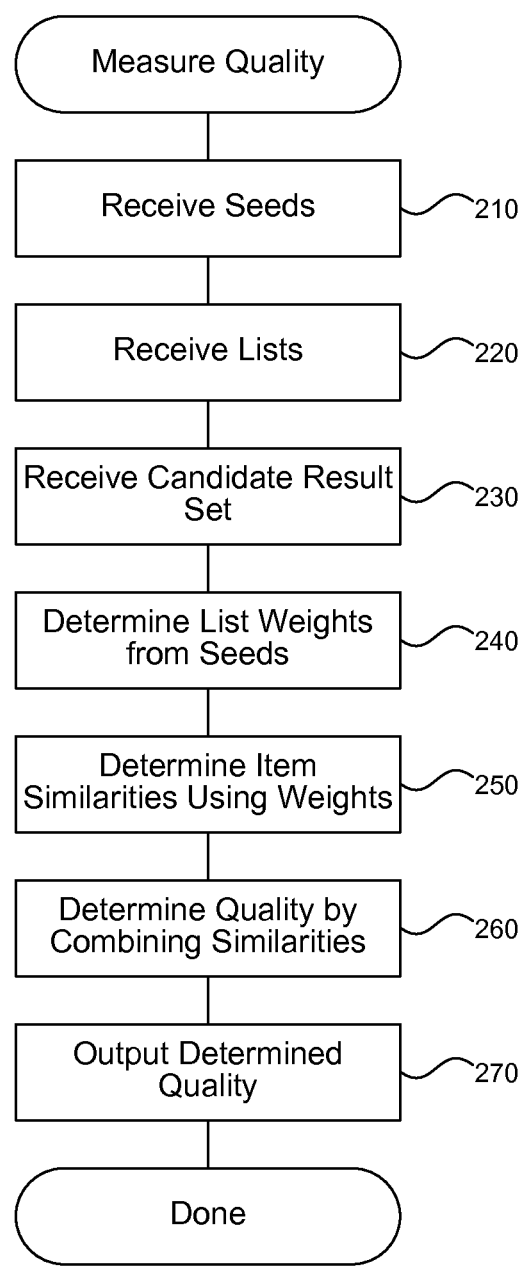
FIG. 2 is a flow diagram that illustrates processing of the set expansion system to measure the quality of a candidate result set expanded from a set of seed items, in one embodiment.

FIG. 2 is a flow diagram that illustrates processing of the set expansion system to measure the quality of a candidate result set expanded from a set of seed items, in one embodiment.

Beginning in block 210, the system receives one or more seed items that represent members of a concept set for which a user wants to automatically generate additional members. For example, the concept set may be automobile manufacturers, and the user may only know a few but want to find more of them. The user provides the known members as seeds, and the system finds more like the seeds. The system may receive seeds through a user interface or programmatically. In addition, the system may automatically identify more seeds based on a set of seeds provided as input. In some cases, the system may query the user to propose suggested seeds from which the user can select to increase the accuracy of the system in generating additional seeds. The received seeds may include separately identified positive and negative seeds, where negative seeds are items that are known not to be members of the concept set (but that may be commonly found with items that are members of the concept set).

Continuing in block 220, the system receives one or more lists that include some items that are members of the concept set and other items that are not members of the concept set. The system's task is to discern those items that are members of the concept set from those that are not based on the received seeds. The system may receive lists from a variety of sources, such as from web crawl data, web query logs, and so forth. The system may receive the lists by invoking a search engine or other component to find lists related to the received seeds.

Continuing in block 230, the system receives a candidate result set that expands the received seed items to include items suspected of being members of the concept set. The system may receive the candidate result set from the user or another process or may generate the candidate result set automatically. For example, the system may perform an initial pass of SEISA or the techniques described herein to generate a quick initial guess of a good result set that the system can iteratively refine into a better set. These steps provide a measure of quality for each result set that can be used to determine whether one result set is a better result than another is.

Continuing in block 240, the system determines a weight for each received list based on the received seeds, wherein the weight corresponds to an initial measure of the quality of the list. The weight may include a comparison of how many positive seeds the list contains versus how many negative seeds the list contains (or does not contain). In some cases, the system calculates a ratio of the number of positive seeds present (and negative seeds not present) to the total number of seeds. The system may also apply a cutoff so that the weights of lists that contain an insufficient number of positive seeds are given a reduced or zero weight.

Continuing in block 250, the system determines a similarity metric of each item in the received candidate result set with the received seed items based on which of the received lists contain each item and the determined list weights. The similarity metric may include a Jaccard, Cosine, or other similarity or distance measurement that determines how related an item in the candidate result set is to the seeds. The system may determine similarities in a distributed fashion, such as using Map Reduce techniques to partition the steps described herein to different computer systems and to combine the results upon completion.

Continuing in block 260, the system determines a quality of the received candidate result set by combining the determined similarity metrics. For example, the system may add the similarity metric for each item in the candidate result set to determine the quality, in some embodiments, the system may determine both relevance and coherence as described herein. The system may then weight the relevance and coherence to determine an overall quality of the candidate result set.

Continuing in block 270, the system outputs the determined quality of the candidate result set. The system may provide the output through a user interface to a user or programmatically to other systems or components that may use the results for further processing. After block 270, these steps conclude.

Figure 3:
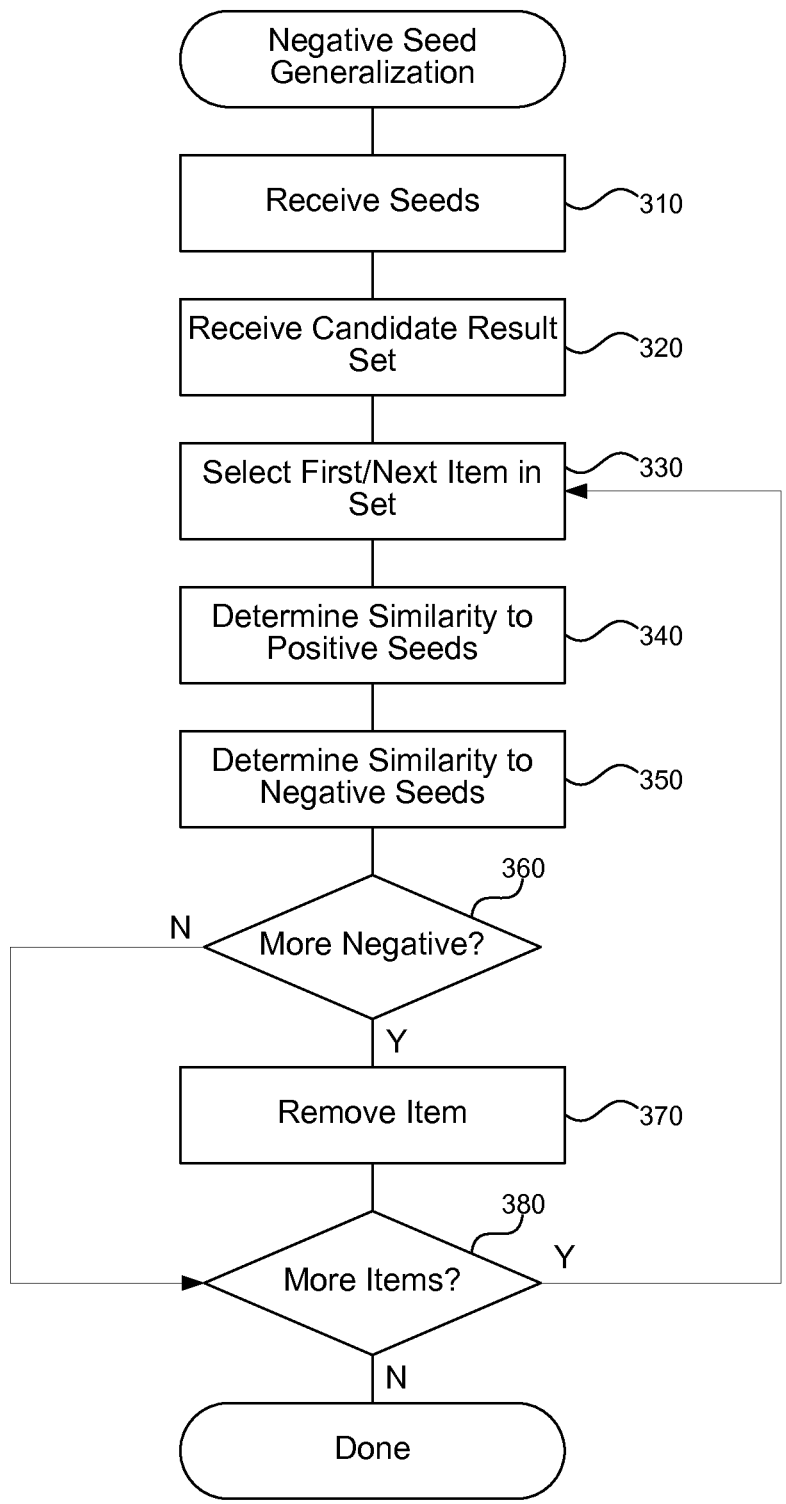
FIG. 3 is a flow diagram that illustrates processing of the set expansion system to generalize and apply a set of negative seeds to a candidate result set, in one embodiment.

FIG. 3 is a flow diagram that illustrates processing of the set expansion system to generalize and apply a set of negative seeds to a candidate result set, in one embodiment.

Beginning in block 310, the system receives one or more seed items that represent members of a concept set, wherein the received seeds include separately identified positive and negative seeds, wherein positive seeds are items that are believed to be members of the concept set and negative seeds are items that are believed not to be members of the concept set. For example, the concept set may be automobile manufacturers, and the user may only know a few but want to find more of them. The user provides the known members as seeds, and the system finds more like the seeds. The system may receive seeds through a user interface or programmatically. In addition, the system may automatically identify more seeds based on a set of seeds provided as input. In some cases, the system may query the user to propose suggested seeds from which the user can select to increase the accuracy of the system in generating additional seeds.

Continuing in block 320, the system receives a candidate result set that expands the received seed items to include items suspected of being members of the concept set. The system may receive the candidate result set from the user or another process or may generate the candidate result set automatically. For example, the system may perform an initial pass of SEISA or the techniques described herein to generate a quick initial guess of a good result set that the system can iteratively refine into a better set. These steps provide a measure of quality for each result set that can be used to determine whether one result set is a better result than another is. The system may receive a result set that is the output of the process described with reference to FIG. 2.

Continuing in block 330, the system selects a first item in the received candidate result set. In some cases, the items may be first ranked so that the system processes most relevant or least relevant items first. Upon subsequent iterations, the system selects the next item in the result set to be processed until all items in the result set have been processed or an exit condition has been reached. In some cases, the system may stop the generalization process after items above a threshold level of quality are reached.

Continuing in block 340, the system determines a positive similarity metric between the selected item and the received positive seed items. The similarity metric may include a Jaccard, Cosine, or other similarity or distance measurement that determines how related an item in the candidate result set is to the seeds. The system may determine similarities in a distributed fashion, such as using Map Reduce techniques to partition the steps described herein to different computer systems and to combine the results upon completion.

Continuing in block 350, the system determines a negative similarity metric between the selected item and the received negative seed items. The similarity metric may include a Jaccard, Cosine, or other similarity or distance measurement that determines how related an item in the candidate result set is to the seeds. The system may determine similarities in a distributed fashion, such as using Map Reduce techniques to partition the steps described herein to different computer systems and to combine the results upon completion.

Continuing in decision block 380, if the system determines that the negative similarity metric is greater than the positive similarity metric, then the system continues at block 370, else the system jumps to block 380. An item that is more similar to negative seeds than positive seeds indicates an item that likely is not a member of the concept set, even though it may have scored well with respect to quality.

Continuing in block 370, the system removes the selected item from the received candidate result set. This produces a new candidate result set without the item that is likely a better candidate result set more closely aligned with the concept set. This process generalizes negative seed items to remove items that are more like the negative seed items than the positive seed items and acts as a secondary check on the quality of the candidate result set.

Continuing in decision block 380, if there are more items in the candidate result set then the system loops to block 330 to select and process the next item, else the system completes. After block 380, these steps conclude.

In some embodiments, the set expansion system runs multiple passes of the techniques described herein to improve results. For example, the system may run SEISA to expand a small number of seeds to a larger number of seeds (e.g., from three to 50), then may run again using the cutoff and list weights described herein to identify additional set members with high precision. The system described herein greatly increases recall while maintaining high precision. For example, in one experiment attempting to identify U.S. cities, SEISA finds 4,000 cities at a 90% precision level while the system herein finds 12,000 cities at the same precision. Factoring in list quality results in dramatically higher precision.

In some embodiments, the set expansion system applies distributed computing to increase efficiency. As described herein, the system can apply Map Reduce and other techniques to distribute work that can be performed in parallel to other computing resources. Because the system operates on very large sets of data, the system can operate more efficiently with access to more computing resources and I/O bandwidth. The system may use sparse matrix multiplication and other techniques when computing similarities, quality, and other metrics to complete tasks faster.

From the foregoing, if will be appreciated that specific embodiments of the set expansion system have been described herein for purposes of illustration, but that various modifications may be made without deviating from the spirit and scope of the invention. Accordingly, the invention is not limited except as by the appended claims.

We claim:

1. A computer-implemented method to measure a quality of a candidate result set expanded from a set of seed items, the method comprising:

receiving one or more seed items that represent members of a concept set for which a user wants to automatically generate additional members of the concept set, wherein the one or more seed items includes positive seeds known to be members of the concept set and negative seeds that are known not to be members of the concept set and wherein the negative seeds are items found with items that are members of the concept set and are separately identified from the positive seeds;

automatically identifying additional seeds based on the one or more seed items, wherein the additional seeds includes both positive and negative seeds, wherein the additional negative seeds are identified based on a similarity to the negative seeds;

receiving one or more lists that include some items that are members of the concept set and other items that are not members of the concept set;

receiving a candidate result set that expands the one or more seed items to include items suspected of being members of the concept set;

determining a weight for each of the one or more lists based on the one or more seed items, wherein each weight corresponds to an initial measure of a quality of a list, and wherein determining each weight comprises calculating a ratio of a number of positive seeds present in the list plus a number of negative seeds not present in the list to a total number of seeds;

determining a similarity metric of each item in the candidate result set with the one or more seed items based on which of the one or more lists contain each item and the weight for each of the one or more lists:

determining the quality of the candidate result set by combining the similarity metric for each item in the candidate result set; and outputting the quality of the candidate result set, wherein the preceding steps are performed by at least one processor.

2. The method of claim 1 wherein receiving the one or more seed items comprises querying a user to propose suggested seeds from which the user can select.

3. The method of claim 1 wherein receiving the one or more lists comprises accessing web crawl data to identify lists in crawled web pages.

4. The method of claim 1 wherein receiving the candidate result set comprises generating the candidate result set automatically as an initial guess of a good result set to be improved iteratively based on the quality of the candidate result set.

5. The method of claim 1 wherein determining the weight for each of the one or more lists comprises comparing a number of positive seeds the list contains versus a number of negative seeds the list contains or does not contain.

6. The method of claim 1 wherein determining the weight for each of the one or more lists comprises applying a cutoff so that the weight of a list that contains an insufficient number of positive seeds is reduced.

7. The method of claim 1 wherein determining the similarity metric of each item in the candidate result set comprises applying a Weighted Jaccard or a Weighted Cosine distance measurement that determines how related an item in the candidate result set is to the one or more seed items.

8. The method of claim 1 wherein determining the similarity metric of each item in the candidate result set comprises determining similarities in a distributed fashion using Map Reduce techniques to partition the determination to different computer systems and to combine results upon completion.

9. The method of claim 1 wherein determining the quality of the candidate result set comprises adding the similarity metric for each item in the candidate result set to determine the quality.

10. The method of claim 1 wherein determining the quality of the candidate result set comprises separately determining a relevance and coherence and weighting the relevance and coherence to determine an overall quality of the candidate result set.

11. A computer system for performing high precision set expansion for large concepts, the system comprising a processor and memory configured to execute software instructions within the following components:

a list identification component that identifies one or more lists from one or more sources of potential entities that belong to a concept set of entities for expanding a known set of seed entities to include a larger portion of the concept set;

a seed receiving component that receives one or more seed items comprising a set of positive seed items and a set of negative seed items, wherein positive seed items represent items to expand and find similar items and negative seed items represent items that are not indicative of similar items, wherein the negative seed items are items found with items that are members of the concept set and are separately identified from the positive seed items, the seed receiving component configured to automatically identify additional seed items from the set of positive seed items and the set of negative seed items based on their similarity to the set of positive seed items and the set of negative seed items;

a list weighting component that determines a weight for each of the one or more lists based on a number of positive seed items contained in a list and a number of negative seed items contained in the list, wherein the list weighting component calculates each weight by adding how many positive seed items are in the list to how many negative seed items are not in the list, and then dividing this number by a total number of positive and negative seed items;

a candidate generation component that generates one or more candidate result sets that contain an expansion of items in addition to the positive seed items, wherein the expansion includes one or more items discovered in the one or more sources;

a similarity calculation component that determines a similarity metric between each entity in a generated candidate result set and the one or more seed items;

a quality determining component that combines a relevance metric and a coherence metric to determine a quality metric that indicates relevance and coherence among a set of entities in the generated candidate result set; and an iterative quality component that finds an acceptable result set by generating an initial candidate result set with a base quality metric and iteratively generating new candidate result sets with improved quality metrics.

12. The system of claim 11 wherein the system provides an application-programming interface (API) through which other software components can programmatically access the system to perform set expansion.

13. The system of claim 11 wherein the list weighting component applies a cutoff whereby the weight for each of the one or more lists that does not contain a threshold number of positive seed items is reduced or set to zero.

14. The system of claim 11 wherein the quality determining component determines the relevance metric based on how similar an entity in the candidate result set is to the one or more seed items and determines the coherence metric based on how consistent an entity in the candidate result set is with the rest of the candidate result set.

15. The system of claim 11 further comprising a seed generalization component to generalize the negative seed items, wherein generalization identifies other candidate items that are more like the negative seed items than the positive seed items and removes the other candidate items from the candidate result set.

* * * * *